United States Patent
Caron et al.

(10) Patent No.: US 9,408,240 B2
(45) Date of Patent: Aug. 2, 2016

(54) METHOD AND SYSTEM FOR COMMUNICATING MESSAGE NOTIFICATIONS TO MOBILE DEVICES

(75) Inventors: Alain Caron, Montreal (CA); Sylvain Legault, Pierrefonds (CA); Haraldur Thorkelsson, Montréal (CA); Felix-Etienne Trepanier, Montreal (CA); Teresa Hunkeler, Montreal (CA); Jean Regnier, Laval (CA)

(73) Assignee: Synchronica plc, Kent (GB)

( * ) Notice: Subject to any disclaimer, the term of this patent is extended or adjusted under 35 U.S.C. 154(b) by 895 days.

(21) Appl. No.: 12/065,287

(22) PCT Filed: Aug. 30, 2006

(86) PCT No.: PCT/CA2006/001416
§ 371 (c)(1),
(2), (4) Date: Mar. 31, 2008

(87) PCT Pub. No.: WO2007/025373
PCT Pub. Date: Mar. 8, 2007

(65) Prior Publication Data
US 2008/0263170 A1    Oct. 23, 2008

Related U.S. Application Data

(60) Provisional application No. 60/712,090, filed on Aug. 30, 2005.

(30) Foreign Application Priority Data

Aug. 30, 2005  (CA) ..................................... 2517526

(51) Int. Cl.
*G06F 15/16*   (2006.01)
*H04W 76/02*   (2009.01)
*H04L 29/06*   (2006.01)
*H04W 68/00*   (2009.01)
*H04W 80/06*   (2009.01)

(52) U.S. Cl.
CPC ............ H04W 76/022 (2013.01); H04L 69/14 (2013.01); H04L 69/16 (2013.01); H04W 68/00 (2013.01); H04W 80/06 (2013.01)

(58) Field of Classification Search
CPC ... H04W 76/022; H04W 68/00; H04W 80/06; H04L 69/16; H04L 69/14
USPC ........................................................ 709/227
See application file for complete search history.

(56) References Cited

U.S. PATENT DOCUMENTS

2002/0022453 A1    2/2002  Balog et al.
2004/0044771 A1    3/2004  Allred et al.
2006/0067222 A1    3/2006  Endoh

FOREIGN PATENT DOCUMENTS

GB    2398204 A  * 11/2004    .............. H04L 29/06
WO    02/29599         4/2002

OTHER PUBLICATIONS

WV-044 Client-Server Protocol Transport Bindings. Approved Version 1.2—Jan. 25, 2005. pp. 1-21.*
Push OTA Protocol. Version 25. Apr. 2001. pp. 1-44.*
"Client-Server Protocol Transport Bindings" (Candidate Version 1.3) Open Mobile Alliance, OMA; Oct. 11, 2005.
Rosenberg, J. et al. "Session Initiation Protocol (SIP): Locating SIP Servers." Network Working Group Request for Comments: 3263; Jun. 2002.

* cited by examiner

*Primary Examiner* — John MacIlwinen
(74) *Attorney, Agent, or Firm* — Soquel Group LLC (57) ABSTRACT

There is disclosed a system and method for choosing between different Communication Initiation Request (CIR) channels in a mobile communications system when there are multiple CIR channels amongst which to choose. Additionally, there is disclosed a system and method for exploiting a Transmission Control Protocol (TCP) connection usage pattern that is characterized by periods of inactivity.

28 Claims, 8 Drawing Sheets

METHOD AND SYSTEM FOR COMMUNICATING MESSAGE NOTIFICATIONS TO MOBILE DEVICES

FIELD OF THE INVENTION

This application is directed to methods and systems for communicating message notifications and, in particular, to methods and systems for communicating message notifications from a server to mobile devices.

BACKGROUND TO THE INVENTION

As known in the art, end-to-end communications in a telecommunications network (for example, between a client and server) are typically carried out via a transport mechanism. Data passed to the transport mechanism from one end system, such as a client, is relayed to the other end system, such as a server, via the underlying network infrastructure which remains largely transparent to the end systems. The client in mobile systems is typically resident in the mobile handset or device, while the server is typically resident at a fixed location, separated from the mobile handset by at least one wireless network and perhaps a plurality of ground networks.

In a network, the client/server model provides a convenient way to interconnect programs that are distributed efficiently across different locations. Typically in the usual client/server model, one server (sometimes called a daemon) is activated and awaits client requests. As a result, connections in the client/server model are established by the client requesting opening of a connection with the server. This causes difficulties in implementations such as mobile communications where, in order to allow for the use of devices with limited capabilities, many mobile devices are equipped to operate solely as clients. As a result, a data channel between client and server can only be initiated by the mobile device.

The communication model described above is a client-server model, which enables a client to set up a connection with the server. A limitation of the above-described communication model is that it does not allow the server to set up the connection with the client. In order to overcome this limitation, a mechanism known as a Communication Initiation Request (CIR) may be used. A CIR allows the server to inform the client that it should establish a communication channel, as per the previously described client-server model.

SUMMARY OF THE INVENTION

According to at least some example embodiments, there is a system and method for choosing between different CIR channels when there are multiple CIR channels amongst which to choose.

According to at least some example embodiments, there is a system and method for exploiting the usage pattern which is exhibited when TCP is being used as the sole or primary transport mechanism for CIR in order to significantly increase the number of concurrent TCP connections that a given server can support.

According to one example embodiment, there is a method for transmitting a CIR message from a server to a mobile client that supports a plurality of CIR channels. The method includes a CIR message transmission step during which a first of the plurality of CIR channels is selected, and an attempt is made to transmit the CIR message via the first selected CIR channel. If the CIR message cannot be transmitted by the first selected CIR channel, the channel selecting and transmission attempting are repeated using a second one of the plurality of CIR channels.

According to another example embodiment, there is a ground end system in a mobile communications system. A server runs on the ground end system and is in communication with at least one mobile client that supports a plurality of CIR channels. The server includes computer code for generating a CIR message. The server also includes computer code for selecting a first of the plurality of CIR channels. The server additionally includes computer code for attempting to transmit the CIR message via the first selected CIR channel. The server also includes computer code for repeating execution of the selecting code and the transmission attempt code, but for a second one of the plurality of CIR channels, the repeated execution code being employed if the CIR message cannot be transmitted by the first selected CIR channel.

According to yet another example embodiment, there is a method for establishing and maintaining a TCP connection for the transmission of messages between a server and client. The method includes the step of providing, in the server, a conventional server of TCP connections (CCS) and a slow server of TCP connections (SCS). The method also includes the step of receiving a connection request at the server, from the client. The method additionally includes the step of establishing a TCP connection between the client and the CCS. The method also includes the step of transferring the established connection to the SCS in the server, wherein the SCS receives the messages.

According to yet another example embodiment, there is a ground end system in a mobile communications system. A server runs on the ground end system and is in communication with at least one mobile client. The server includes a conventional server of TCP connections (CCS), a slow server of TCP connections (SCS), and computer code for receiving and processing a connection request from the mobile client at the server. The server also includes computer code for establishing a TCP connection between the mobile client and the CCS. The server additionally includes computer code for having assignment of the established connection changed from the CCS to the SCS. The SCS receives messages from the mobile client when the SCS is handling the established connection.

According to yet another example embodiment, there is a method for establishing and maintaining a TCP connection for the transmission of messages between a server and client. A conventional connection server and a slow connection server are provided in the server. A connection request is received at the server, from the client, and then a connection is established between the client and the conventional connection server. On expiration of a predetermined inactivity period, the established connection is reassigned to the slow connection server. On reception of a message transferred from the client, the established connection is reassigned back to the conventional connection server if the established connection has been assigned to the slow connection server, and then the message is received at the conventional connection server from the client. On reception of a message for transfer to the client, the established connection is reassigned back to the conventional connection server if the established connection has been assigned to the slow connection server, and then the message is transmitted from the conventional connection server to the client.

BRIEF DESCRIPTION OF THE DRAWINGS

Reference will now be made, by way of example, to the accompanying drawings.

DETAILED DESCRIPTION OF THE ILLUSTRATIVE EMBODIMENTS

Figure 1:
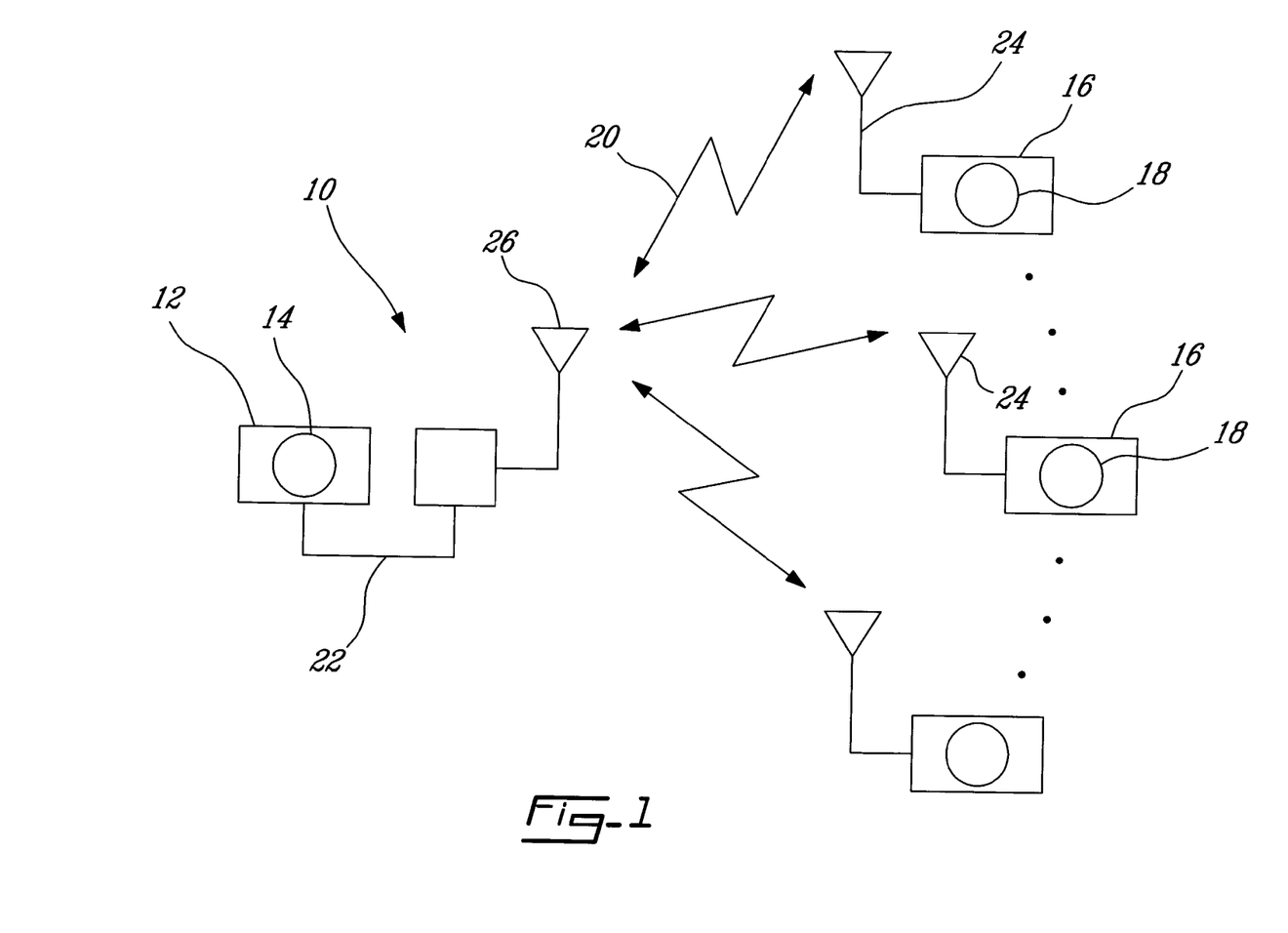
FIG. 1 shows a schematic diagram of a mobile communications system to which embodiments of the present invention can be applied.

Referring now to FIG. 1, an illustrative embodiment of a mobile communications system, generally referred to using the reference numeral 10 will now be described. The system 10 is comprised of one or more ground end systems 12 comprised of a server 14 and a plurality of mobile end systems 16 (for example, a cellular phone, PDA enabled for wireless communication, or other wirelessly enabled mobile device) each comprised of at least one client 18. The ground end systems 12 and the mobile end systems 16 are interconnected by at least one wireless Radio Frequency (RF) network 20 and typically a plurality of interconnected ground networks as in 22. In order to gain access to the wireless RF network 20, each mobile end system 16 is equipped with an antenna 24, and as a result is able to relay data and eventually other communications signals to a second antenna 26 attached to the ground network(s) 22.

Figure 2:
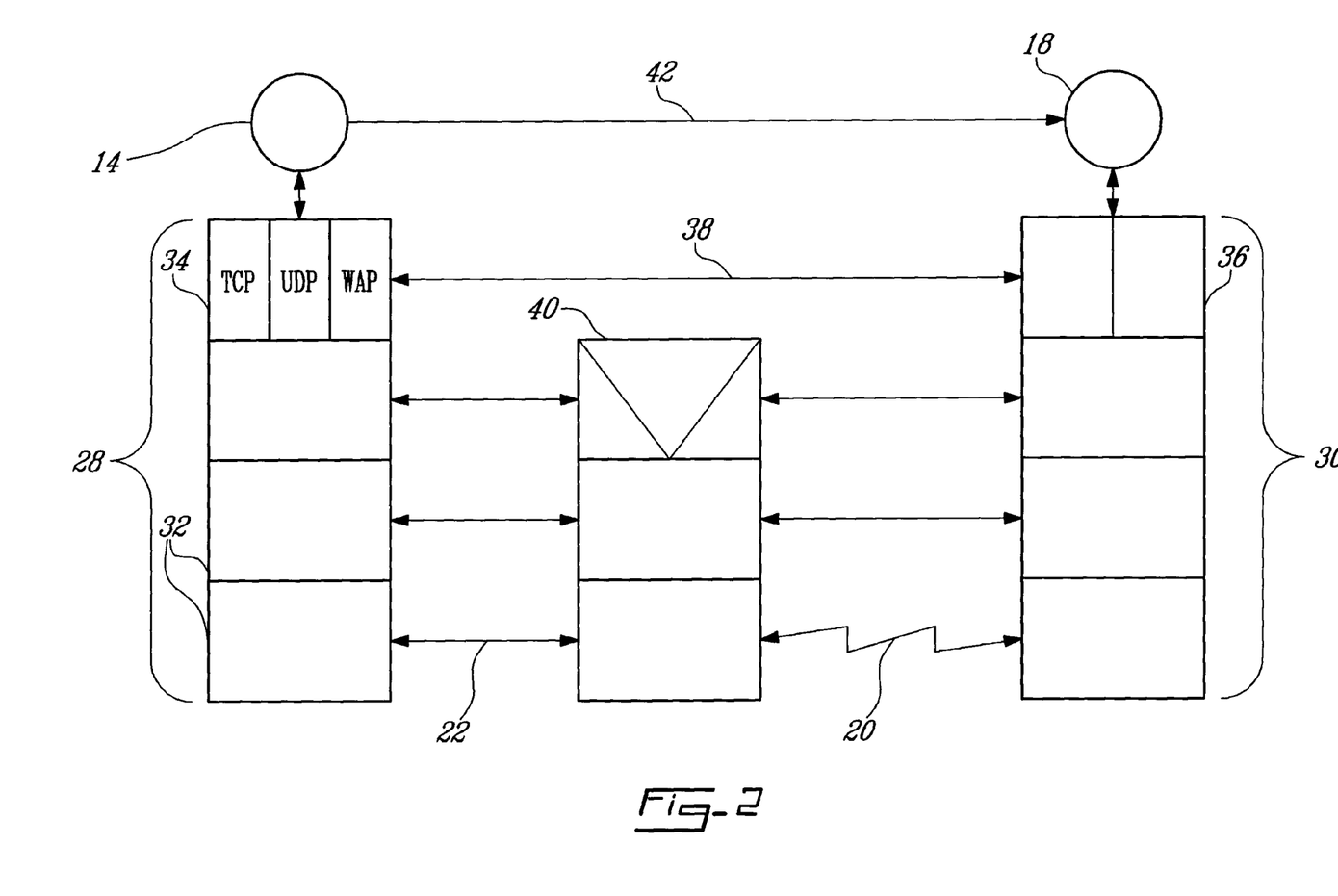
FIG. 2 shows a conceptual model of client-server communications.

Still referring to FIG. 1, the server 14 and client 18 are typically software applications running on their respective end systems 12, 16 which take advantage of the wireless RF network 20 and interconnected ground networks as in 22 to communicate with one another. Referring now to FIG. 2, each server as in 14 or client as in 18 typically has access to the underlying communications networks 20, 22 via protocol stacks as in 28, 30. As known in the art, use of such protocol stacks as in 28, 30 (also known as a "layered architecture") provide distinct advantages in terms of transparency, interoperability and expandability. Each of the protocol stacks as in 28, 30 is divided into a plurality of layers as in 32. Although a protocol stack can have many layers, in order to provide "end to end" communications, such as those provided by the TCP/IP model, four layers are used with the upper most, or transport, layer as in 34, 36 being the only layer typically accessible by the either the server 14 or client 18. Additionally, as known in the art, a client 18 wishing to establish a connection with a server 14 requests this establishment from its respective transport layer 36 using one or more predefined commands typically referred to as primitives. Based on the information provided in the primitives, the transport layer 36 communicates with its peer transport layer 34 and establishes a logical path 38 through which data can flow, thereby allowing the client 18 to communicate with the server 14 and vice versa.

As will be appreciated by those skilled in the art, additional known network devices, such as routers 40 or the like, may be needed to support communication between a particular pair of peer transports layers as in 34, 36.

As previously discussed, data communications between the server 14 and the client 18 are typically initiated by the client 18. However, for some applications such as, for example, Instant Messaging, the server 14 may wish to establish communications with the client 18.

In the Open Mobile Alliance (OMA) Instant Message and Presence Service (IMPS) Standard, which is a standard that has been developed taking the above-mentioned issue into account and which was formerly known as the Wireless Village (WV) Standard, the transport binding is logically divided into two channels. One of these two channels is a bidirectional data channel via which the exchange of Client-Server Protocol (CSP) primitives between client and server is carried out. As will be appreciated by one skilled in the art, possible protocol bindings in the data channel include, for example, WSP, HTTP, HTTPS and SMS. The second of these two channels is a unidirectional CIR channel from server to client which is used to activate the data channel whenever the data channel is not established, or the event communication has been halted in the data channel and needs to be reactivated. As will be later described, a variety of transport mechanisms/methods have been proposed for the CIR Channel such as: Wireless Application Protocol (WAP) push over Short Message Service (SMS), WAP push over User Datagram Protocol/Internet Protocol (UDP/IP), Standalone SMS, Standalone UDP/IP, Standalone Transmission Control Protocol/Internet Protocol (TCP/IP), Standalone Hypertext Transfer Protocol Thus, the OMA IMPS Standard provides for a dedicated CIR channel 42 between the server 14 and the client 18 that in at least some example embodiments is reserved solely for the transfer of CIRs. This dedicated channel may be implemented in a number of different ways depending on the capabilities of the server 14 and, in particular, the client 18 running on, for example, the processor of the end system 16.

For example, if the server 14 and client 18 support TCP/IP, the dedicated CIR channel 42 can be provided by a dedicated TCP/IP connection between peer transport layers 34, 36. This TCP/IP connection would typically be set up during a login procedure and remain alive for as long as a data path is available between the client 14 and server 18. Alternatively, if UDP is supported, UDP can be used to provide the dedicated CIR channel. A similar case arises with both SMS and HTTP which both can be used to provide the dedicated CIR channel in particular implementations. Similarly, on a WAP equipped mobile device WAP push over SMS or UDP/IP as bearer can be used, again depending on the capabilities of the mobile device.

As discussed above, in the OMA IMPS Standard the capabilities of the client 18 and server 14 are exchanged during client-server negotiation during, for example, the login procedure, and part of the information exchanged includes CIR capabilities. This gives an indication to the server 14 which CIR channels are supported by the client 18, and an indication to the client 18 which CIR channels may be used by the server 18. While in some examples the server 14 receives notice from the client 18 during client-server negotiation of the plurality of CIR channels supported by the client 18, in at least one other alternative example the server 14 maintains a CIR capability table that indicates what CIRs a particular client 18 supports. When the client 18 logs in, it identifies itself through a clientId provided during the login transaction. This clientId is then used by the server 14 as a handle to fetch from the CIR capability table the particular CIRs supported by that client. In still other alternative examples, the server 14 expects that the client 18 will support all of the CIR channels within a default set of CIR channels.

As previously mentioned, the OMA IMPS Standard indicates that there are a number of possible transport bindings for supporting the CIR channel, such as: WAP push binding (WAP push over SMS as bearer or WAP push over UDP/IP as bearer), Standalone SMS binding, Standalone UDP/IP binding, Standalone TCP/IP binding, Standalone HTTP binding.

With respect to WAP push binding, WSP push messages are sent from the server 14. If the server 14 is provisioned with an address of the WAP Push Proxy Gateway (PPG) and supports WAP Push Access Protocol (PAP), it can initiate a WAP Push request. To send a CIR to the mobile end system 16, the server 14 can use the push submission operation. In at least some examples, each push message contains a single CIR. Content type (as registered with Internet Assigned Numbers Authority) of the content entity of a Push Access Protocol request is "application/vnd.wv.csp.cir".

The use of WAP Push does not require that the client 18 have active PDP context. (PDP context, as will be appreciated by those skilled in the art, is a data structure containing particular session information.) In some examples, the PPG uses an SMS bearer to send the initiation request. Alternatively, if a PDP context is already active and the Internet Protocol (IP) address is known, the PPG can push the message over TCP or UDP.

Still with reference to WAP push binding, in those examples where the client 18 is in a mobile handset, the mobile number may be provided in the CSP protocol login transaction (as a part of Client ID). If the mobile number is not present, the Service Access Point (SAP) will obtain the mobile number if it is required. Also, it will be understood that if the Mobile Station International Subscriber Directory Number (MSISDN) is available between sessions, offline notification is possible. In the case of offline notification therefore, the MSISDN, received via the login transaction may be cached between sessions or, alternatively, the SAP may obtain the mobile number if it is required.

With respect to Standalone SMS Binding, the CIR channel is facilitated by, for example, Global System for Mobile Communications (GSM) short message or Code Division Multiple Access (CDMA) IS-637 short message technology. Also, in Standalone SMS Binding, both the client 18 and the Short Message Service Center (i.e., network element which delivers SMS messages) will support both Mobile-Originated (MO) and Mobile-Terminated (MT) short messages.

In at least some examples, Standalone SMS binding will support both GSM SMS [TS 23.040] and CDMA SMS IS-637 [TIAEIA-637]. The encoding of SMS messages for CIR can be the GSM 7-bit default alphabet defined in [TS 23.038]. In at least some examples, each SMS message contains a single CIR.

With respect to Standalone UDP/IP binding, the server 14 sends the client 18 the CIR messages enclosed in UDP datagrams. In at least some examples, each UDP datagram contains a single CIR message and the client 18 is capable of receiving UDP datagrams directly from the server 14. Due to the small size of the CIR message, the UDP datagram will not be fragmented or rejected because of size.

The client 18 may, for example, accept the CIR request to a default UDP port. Alternatively, the client 18 may, for example, provide the UDP port in the capability negotiation phase of client login.

Still with reference to Standalone UDP/IP binding, it may be more convenient (due to the behavior of some NAT routers) if whenever the server 14 sends a message to the client 18, the server 14 uses the same IP and port used by the client 18 as the destination address. In at least some examples, this will be the same address as appeared in the ClientCapabilityResponse to the ClientCapabilityRequest (for setting up the communication preferences for the session).

With respect to Standalone TCP/IP binding, there is a persistent connection from the client 18 to server 14 to provide a low-latency always-on CIR channel. As will be appreciated by those skilled in the art, TCP may be more easily usable in certain mobile networks than other Internet Protocols such as User Datagram Protocol (UDP) due, for instance, to security measures implemented in firewalls and other network elements. For these reasons, certain mobile devices support only TCP for CIR.

The TCP CIR channel is a push-type connection-oriented channel, the primary purpose of which is to carry CIRs from the server 14 to the client 18. Once established, a TCP CIR connection serves two purposes: to convey CIRs from the server 14 to the client 18 and to verify that the connection is still alive.

The client 18 is responsible for setting up the TCP/IP connection and maintaining its persistency. The client 18 can open the CIR TCP/IP connection to the server 14 right after a successful login procedure including client capability and service negotiation. The IP address and port for the CIR channel can be provided by the server 14 in the capability negotiation. In at least some examples, the IP address and port are valid throughout the session.

Still with reference to Standalone TCP/IP binding, when a server 14 has any data (CSP request or response) that needs to be sent to the client 18, it sends a CIR message over the TCP/IP connection associated with this client. (Typically, all client and server originated messages will be terminated with a <CR><LF> (carriage return, line feed) sequence, the character-encoding scheme will be UTF-8, and the minimum supported set of characters will be ISO-8859-1 (Latin 1).)

Figure 3:
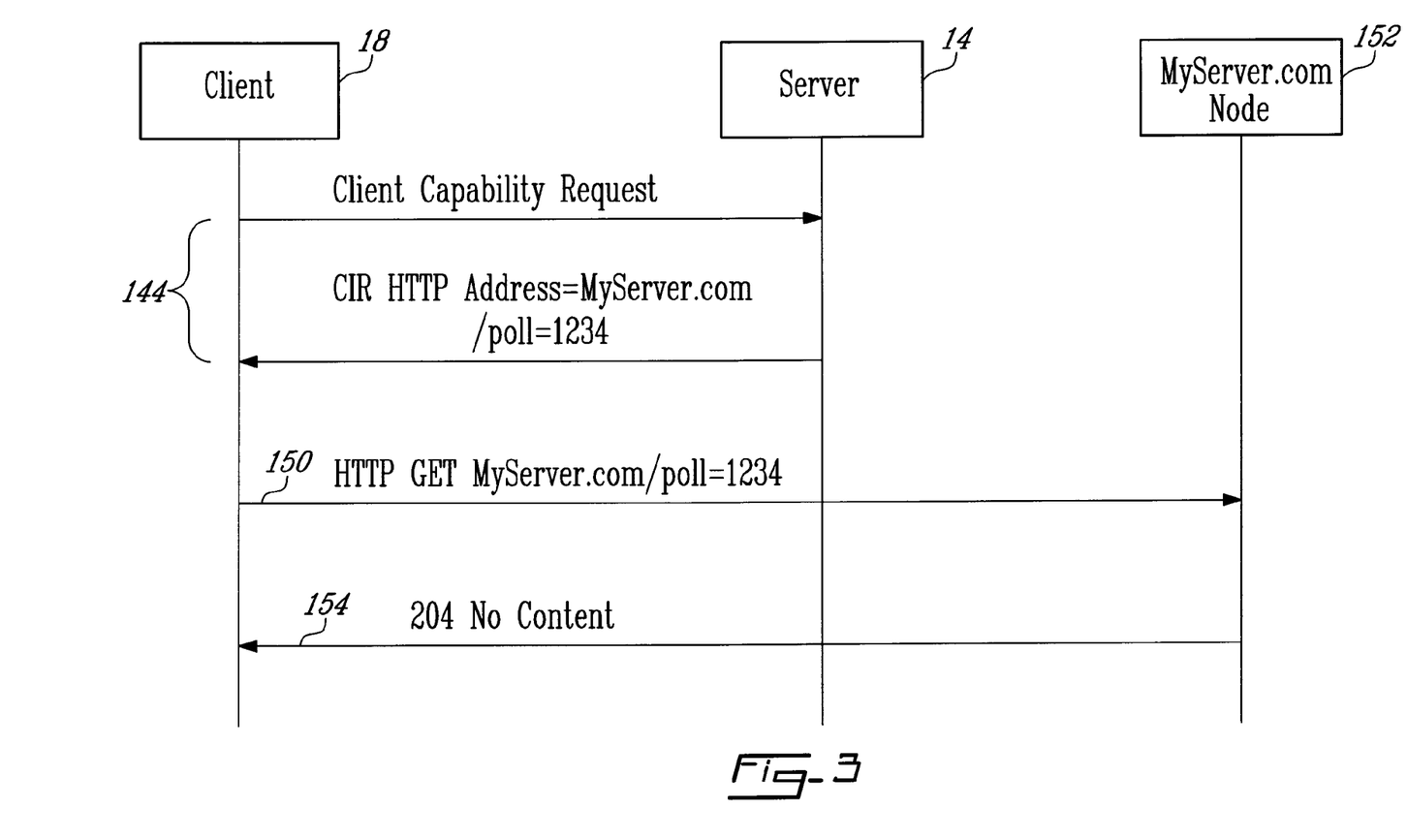
FIG. 3 shows, in diagrammatic form, client polling in HTTP binding for CIR channel when the server does not have any queued requests or responses.
Figure 4:
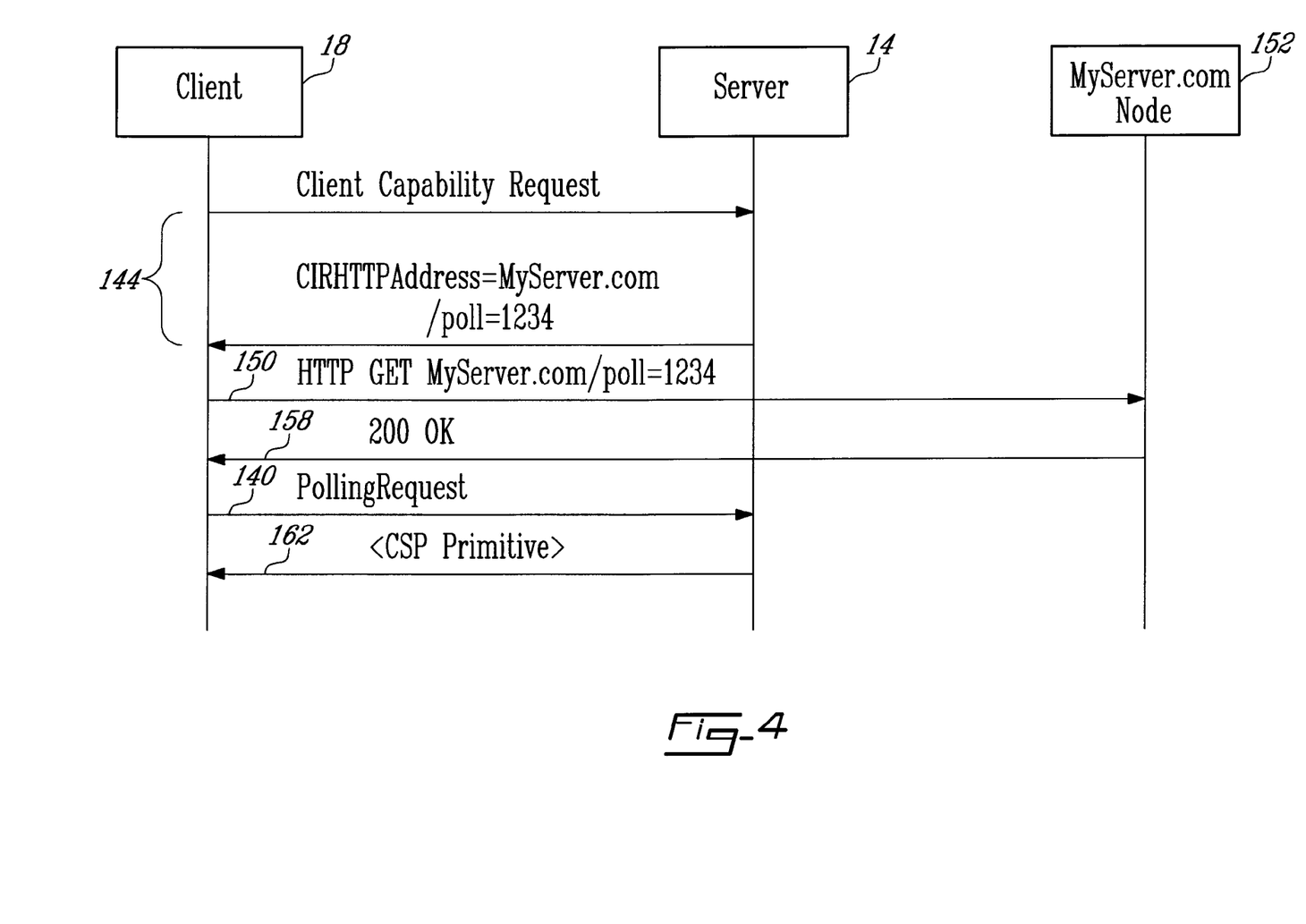
FIG. 4 shows, in diagrammatic form, client polling in HTTP binding for CIR channel when the server has queued requests or responses.

With respect to Standalone HTTP binding as illustrated in FIGS. 3 and 4, the client 18 periodically polls on the CIR channel for a CIR trigger. When a CIR trigger is received, the client 18 sends a CSP PollingRequest 140 (FIG. 4) to enable the server-initiated transaction including server insertion of a transaction request into the response part of the poll request. In at least some examples of other CIR channels, the server-initiated transaction is enabled in the same manner.

One skilled in the art will appreciate that polling is very resource consuming when it comes to bandwidth and server load. Hence, the polling overhead is reduced, in at least some examples, by having periodic polling only done for CIR with a minimal HTTP GET on a non-persistent HTTP connection.

The URL to be used for the CIR poll can, for example, be provided by the server 14 in the capability negotiation (reference numeral 144 in FIGS. 3 and 4). The format of the address is such that the server 14 can identify the session; however for security reasons it may be preferable that the actual Session is not revealed in the HTTP binding. An example format of a poll URL is: MyServiceProvider.com/poll?pc=1234567 (The 'pc=1234567' is an example poll cookie that the server 14 generates and internally uses to map to the real session.) The URL is valid throughout the session, and it will be understood that the client 18 closes the HTTP connection after each poll.

Still with reference to the above-described Standalone HTTP binding, the client 18 is responsible for setting up the HTTP connection and doing the polling. The minimum time between two polls can be given by the server 14 during client capability negotiation. The client 18 starts to poll after it successfully logs in and has completed appropriate client capability and service negotiation.

In the presently described examples, the Client 18 uses the HTTP GET method to poll on the HTTP binding. (This is illustrated in FIGS. 3 and 4 by a directional arrow 150 between the client 18 and MyServer.com node 152). If there are no queued CSP messages on the server 14, the server 14 replies (in at least some examples) with '204 No Content' (as shown by directional arrow 154 in FIG. 3). If CSP messages are queued on the server 14, the server 14 replies (in at least some examples) with a '200 OK' (as shown by directional arrow 158 in FIG. 4). The reply substitutes for the textual CIR message that is used in other CIR channel bindings. If '200 OK' is received, the client 18 then performs a CSP Polling Request transaction to retrieve the server-initiated transaction. As shown in FIG. 4, in response to the client 18 sending a CSP PollingRequest 140 to the server 14, the server 14 sends a CSP Primitive to the client 18 on the data channel (as shown by directional arrow 162).

In some examples, the client 18 implements an adaptive polling policy. For instance, when polling requests return a CIR trigger to do a CSP PollingRequest Transaction, the client 18 will normally initiate the next polling request after some minimum interval. However, in the case of empty responses, the polling intervals can be gradually increased (for example, up to 10 seconds or more).

In at least some examples, HTTP binding is used by clients that cannot establish any other CIR channel.

Having described various example transport bindings for supporting the CIR channel, it will of course be understood that there are different trade-offs to consider when choosing a particular CIR channel/method, including latency of a particular method, cost for a particular network, or features supported by the mobile handset or device.

Also, at the beginning of the session (for example, during a negotiation portion of login) the client 18, in some examples, supplies the server 14 with a list of supported CIR channels or methods. The server 18 may choose to use only a particular CIR channel for the duration of the session. However, using only a particular CIR channel or method may not take advantage of the redundancy or other advantages supported by the simultaneous use of a plurality of different CIR channels. In order to do this, a dynamic selection of the CIR channel to be used during a session is provided for in at least one example embodiment.

Figure 5:
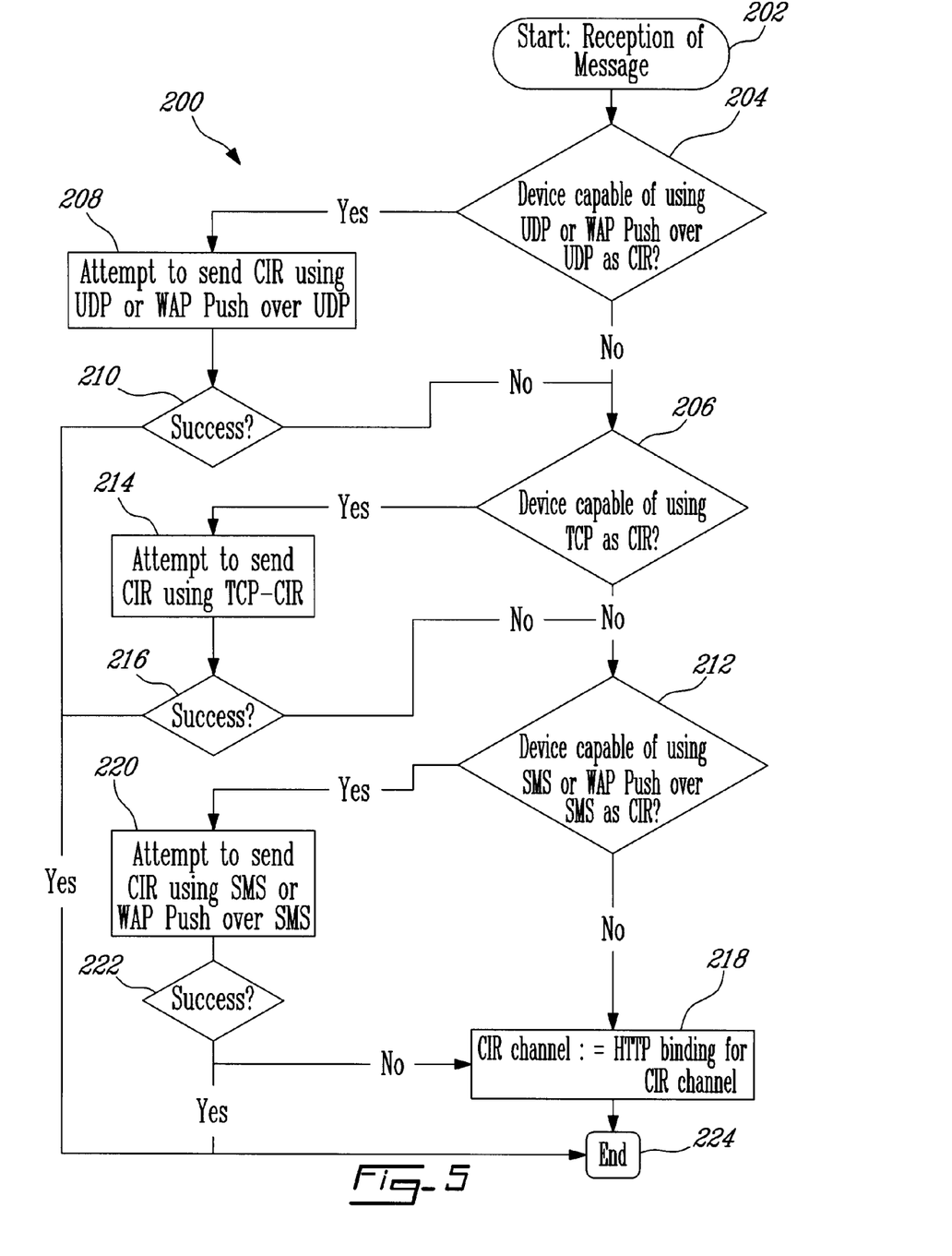
FIG. 5 is a flow chart of a method for selecting a Communication Initiation Request (CIR) channel in accordance with an illustrative embodiment of the present invention.

An example of a method for allowing the server 14 to choose a CIR channel during a session is shown in FIG. 5, and the illustrated method will be generally referred to herein using the reference numeral 200. Beginning at start step 202, when the server has a CIR to send to the client 18, the server 14 is configured to first determine if the preferred method of sending the CIR is supported by the client 18 and the mobile handset or device. In the illustrated example, the preferred method is UDP, and therefore at example step 204 the server 14 determines whether or not there is support for UDP or WAP Push over UDP as CIR. If there is no such support, the next step is step 206 where the server 14 determines whether or not there is support for the next alternative (which in the case of the illustrated example is TCP as CIR). If however it is determined at the step 204 that there is support for UDP or WAP Push over UDP as CIR, the next step is step 208 where an attempt is made to use the CIR channel. As will be appreciated by those skilled in the art, the CIR channel with respect to which the first attempt is made may not be usable (for example, due to a connection that is not established or the like) and therefore a check is carried out at step 210 as to whether the CIR was sent successfully. If the chosen CIR channel is successful, the illustrated process ends at end step 224. If the first CIR channel chosen is not successful, the step 206 follows (see above).

Still with reference to the method 200, if at the step 206 it is determined that there is no support for TCP as CIR, the next step is step 212 where the server 14 determines whether or not there is support for the next alternative (which in the case of the illustrated example is SMS or WAP Push over SMS as CIR). If however it is determined at the step 206 that there is support for TCP as CIR, the next step is step 214 where an attempt is made to use the CIR channel. As previously discussed, the CIR channel with respect to which the attempt is made may not be usable for some reason, and therefore a check is carried out at step 216 as to whether the CIR was sent successfully. If there was success, the illustrated process ends at the end step 224. If there was failure, the step 212 follows (see above).

Continuing on with the description of the illustrated method 200, if at the step 212 it is determined that there is no support for SMS or WAP Push over SMS as CIR, the next step is step 218 where HTTP binding for CIR channel is set as the CIR channel. (It will be understood that HTTP binding for CIR channel is the last CIR channel alternative in the illustrated method 200, and that the step 218 being carried out means that channel attempts have been made for all of the CIR channels that were indicated as being supported.) If however it is determined at the step 212 that there is support for SMS or WAP Push over SMS as CIR, the next step is step 220 where an attempt is made to use the CIR channel. As previously discussed, the CIR channel with respect to which the attempt is made may not be usable for some reason, and therefore a check is carried out at step 222 as to whether the CIR was sent successfully. If there was success, the illustrated process ends at the end step 224. If there was failure, the step 218 follows (see above), after which is the end step 224, and then the server waits for the client to poll using HTTP.

It will be understood that the order of selecting the CIR channel as shown in FIG. 5 is only illustrative and is not intended to otherwise limit the manner in which a CIR channel may be selected. The order in which the CIR channels are attempted is configurable per deployment, as different networks may have conditions that prioritize differently the selection of one method over another.

In the event that a client 18 has available CIR channels based on both SMS and TCP/IP, the following method of selecting between them may be used between the client 18 and server 14. This method ensures that the network is used efficiently for CIR and that the user has minimal delays in receiving messages while using the application.

When the user opens an application requiring a CIR channel, for example an Instant Messaging application or the like, the client 18 sets up a dedicated TCP/IP CIR channel. This CIR channel is maintained for a period of time, typically for at least as long as the user is using the application, although it should be noted that a user can be logged onto the server 14 without the application actively running on the handset. If the user shuts down the application, or the application is automatically closed, the TCP-CIR channel is closed by the client 18. If the server 14 has detected that a CIR must be sent to the client 18, it tries first to use the TCP-CIR channel. If there is no TCP-CIR channel established, the server 18 sends the CIR using the SMS CIR channel. When the mobile handset or device receives the CIR via SMS, if the mobile handset or device is capable of launching the application, the application (for example, an Instant Messaging client) is then started, and a TCP CIR channel is established. In this manner, the SMS CIR channel may be used to "wake-up" both the application and the TCP CIR channel. Note that typically SMS would only be used if the application in question was not running and no TCP CIR channel is available.

The OMA IMPS Standard provides no mechanism for allowing the client to indicate its preference of CIR channels to use. Additionally, in the case of particular limitation(s) or preference(s) in the mobile device or client in terms of supported CIR channels there is no way to signal this to the server. An example of this is if the client prefers to use a TCP CIR channel even though an SMS CIR channel is also available. To allow for the client 18 to indicate its preference to the server 14, when the client 18 provides the list of supported CIR channels to the server 14 during negotiation, the client 18, in some examples, additionally indicates a preferred order in which the server 14 should attempt to use these CIR channels.

In some examples, an order list providing the preferred order as described above will be stored (pre-negotiation) on the client 18. In additional examples, the order list could be stored (pre-negotiation) on the server 14 and indicate the preferred channels for the server 14 (instead of the client's preferred channels). In further additional examples, there could be order lists stored both on the server 14 and the client 18, and weighting could be used to generate a third order list that would be a best match of the preferences of both the client 18 and the server 14.

Dynamic changing of the order list is envisioned: for example, in response to detection that a server-provisioned address of a WAP PPG has become invalid, any WAP push binding options in the order list might be removed from the order list (or, for example, moved to the bottom of the order list). As another example, the same modification of the order list might be carried out if the SAP cannot obtain an MSISDN that it needs. As yet another example, there might be, for example, detection that a client-provided UDP port is invalid, and the dynamic change in this case might be, for example, deleting the WAP push over UDP/IP and Standalone UDP/IP options from the order list (or, for example, moving these options down to the bottom of the order list). As yet another example, system security settings might change such that the client 18 is prevented from storing the poll cookie so as to possibly prevent Standalone HTTP binding, and therefore the dynamic change in this case might be removal of the Standalone HTTP binding option from the order list.

As mentioned previously, the communication model used in the OMA IMPS Standard uses two channels: a mandatory data channel in which the exchange of data is carried out, and an optional CIR channel which serves to activate the data channel when it is not established and data needs to be communicated.

Figure 6:
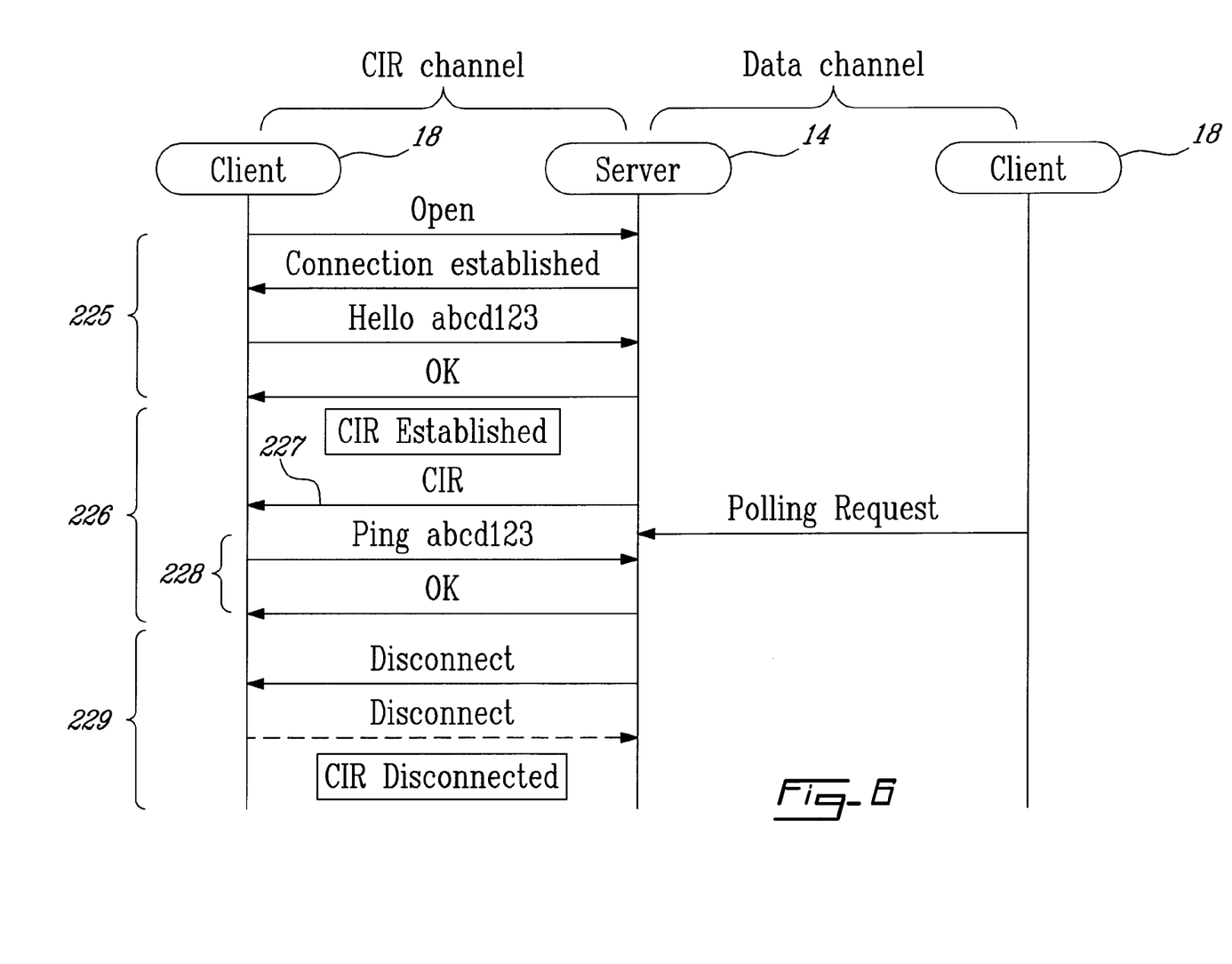
FIG. 6 shows, in diagrammatic form, the use of TCP protocol by the OMA IMPS Standard in accordance with an illustrative embodiment of the present invention.

Thus CIR channel usage and data channel usage are quite different, and usage of an example CIR channel is shown in FIG. 6 and described below. It will be noted that although FIG. 6 shows a CIR channel for a Standalone TCP/IP binding example, other types of CIR channel bindings are also comparatively described below, more than one of which are characterized by similar message traffic.

CIR establishment (reference numeral 225 in FIG. 6): This is the initial phase during which the client and server establish the TCP CIR channel. The procedure is as described below.

(1) As the illustrated initial step, the client 18 initiates the TCP connection to provide a TCP CIR channel between client 18 and server 14.

(2) Next, the server 14 responds to the client 18 by establishing the TCP connection. (It should be noted that there may be connection establishment issues if the client 18 is behind a firewall or proxy, and technology alternatives to facilitate the connection initiation and management include HTTP Tunneling [TCPTunnel], SOCK4 and SOCK5.)

(3) Immediately upon receiving the response from the server 14 confirming that the TCP connection has been established, the client 18 sends the authentication message "HELO" with the Session ID as a parameter. This allows the server 14 to associate the new TCP/IP connection with one of the existing sessions. If the server 14 does not receive a "HELO" message within a pre-determined period of time (for example, 10 seconds) after a new connection has been opened from the client 18, or if the received Session ID is unknown, the server 14 will terminate the connection.

In Standalone SMS Binding by comparison, the client 18 sends an SMS to the server 14 comprising the message "HELO" (GSM 7-bit default alphabet [TS 23.038] encoded, for example) with the Session-ID as a parameter. The SMS carrying the "HELO" message allows the server 14 to discover the mobile number of the client 18. Caching between sessions of the MSISDN received via the "HELO" message may permit offline notifications.

In Standalone UDP/IP binding by comparison, the client 18 sends a UDP/IP packet to the server 14 comprising the message "HELO" with the Session-ID as a parameter. The packet carrying the "HELO" message allows the server 14 to discover the IP address of the client 18 and to overcome possible NATs. In at least some examples, the HELO message is sent to the IP and port set by the server 14 in the ClientCapabilityResponse message.

(4) Upon receiving the "HELO" message from the client, the server replies to the client with an "OK" message, and also a communication initiation request message [not explicitly shown] having parameters to provide additional information needed, at which point the TCP CIR channel is established.

In Standalone UDP/IP, the server 14 also replies to the "HELO" message of the client 18 with an "OK" message and the communication initiation request message.

CIR usage (reference numeral 226 in FIG. 6): This is the phase during which the client 18 and server 14 use the CIR channel, and starts once the CIR channel has been established. During this phase, the TCP CIR channel is used for either of two purposes as described below.

First purpose: communication of CIR messages (directional arrow 227 illustrates the sending of a CIR message from the server 14 to the client 18). (1) The server 14 communicates a CIR when it wants to notify the client 18 that it should poll the server; and (2) the client 18 does not respond to the CIR over the TCP CIR channel. Rather, the client 18 is then expected to originate a PollingRequest message over the data channel (note that the PollingRequest message is not directly relevant for purpose of the TCP CIR channel discussion, and is only outlined here to facilitate a better understanding of the role of the CIR channel and the data channel in the OMA IMPS Standard).

Second purpose: Keepalive (reference numeral 228 in FIG. 6). It is possible that the TCP CIR channel may be closed, for example if it has been inactive for a long duration or due to network problems. To prevent this from happening or to be able to recover, the client 18 illustratively implements a Keepalive mechanism enabling it to verify periodically a TCP CIR channel to the server 14 is still open. This mechanism is as follows: (1) The client 18 sends a "PING" message over the TCP CIR channel; (2) the server 14 responds to the "PING" message with the "OK" message; and (3) if a delay of several seconds (for example, thirty seconds) between sending a "PING" and receiving a corresponding "OK" expires, the TCP CIR channel is re-established, for example using the method as described hereinabove.

In the context of UDP/IP binding by comparison, it will be understood that the public address of the client 18 may, in some cases, be changed (i.e., by a NAT application) and by that not allow the server 14 to communicate with the client 18. To prevent this from happening, the client 18 can periodically send "PING" messages over UDP/IP to maintain its address. The server 14 responds to these messages with the "OK" message. If the client 18 does not receive an "OK" message within a pre-established period of time, it sends the "HELO" message again. Since the IP address assigned to the client 18 may also change due to network considerations (for example, by GGSN or PDSN), the PING message also contains the session ID, similar to the HELO message. In this case, the server 14 is able to identify the PING, even if the IP address has changed and update its routing table accordingly.

CIR teardown (reference numeral 229 in FIG. 6): This is the closing phase during which the client or the server closes the TCP connection.

The CIR establishment and teardown phases are relatively short. However, it is important to note that the TCP CIR channel makes particular uses of the TCP protocol during the CIR usage phase, notably: (1) Once the TCP CIR is established, the CIR channel may be held up for a very long duration, on the order of several hours or days; (2) the transactions carried over the TCP CIR connection are very short, for example, the exchange of one or two messages, and are infrequent; (3) three specific messages may be exchanged ("PING" from the client to the server, and "CIR" and "OK" from the server to the client); (4) the three messages are relatively short, and can be transmitted within single TCP socket read/write operations; and (5) the client can tolerate a delay of several seconds between initiating a message and receiving its response (for example, 30 seconds).

Within the historical context of fixed ground networks within which existed TCP's primary use, it was common for servers implementing TCP methods and best practices to have been developed under the assumption that the usage pattern of TCP is driven by Internet-type services such as web browsing using HTTP over TCP. In this type of usage, each TCP connection is set up for a short duration, during which it is intensely used. Typically, a given server in such an environment will have a capacity of approximately 10,000 concurrent TCP connections. However, in a mobile environment, the use of TCP as a single CIR requires each mobile handset or device to open the TCP connection to the server, and then requires the mobile handset or device and the server to maintain the TCP connection established for a duration that may be extremely long, on the order of several hours or days. During the time which the TCP connection is established, the connection is largely dormant, except for short periods of activity. When a large number of mobile devices using only TCP for CIR are deployed, the server is required to support a very large number of concurrent TCP connections. This is an atypical usage of TCP connections, which are usually kept open only for a short duration while there is a transfer of data ongoing and then closed. Keeping such long duration TCP connections open requires management both on the mobile device and on the server side.

In accordance with at least one example embodiment, a method as described below implements a two-state process for each TCP CIR channel between the server 14 and one of the pluralities of clients 18 to establish and maintain the TCP CIR channels. In a first state, the TCP CIR channel is established. In a second state, the TCP CIR channel is monitored to detect and serve incoming or outgoing messages. This monitoring exploits the specific use of the TCP protocol for TCP CIR channel purposes.

Figure 7:
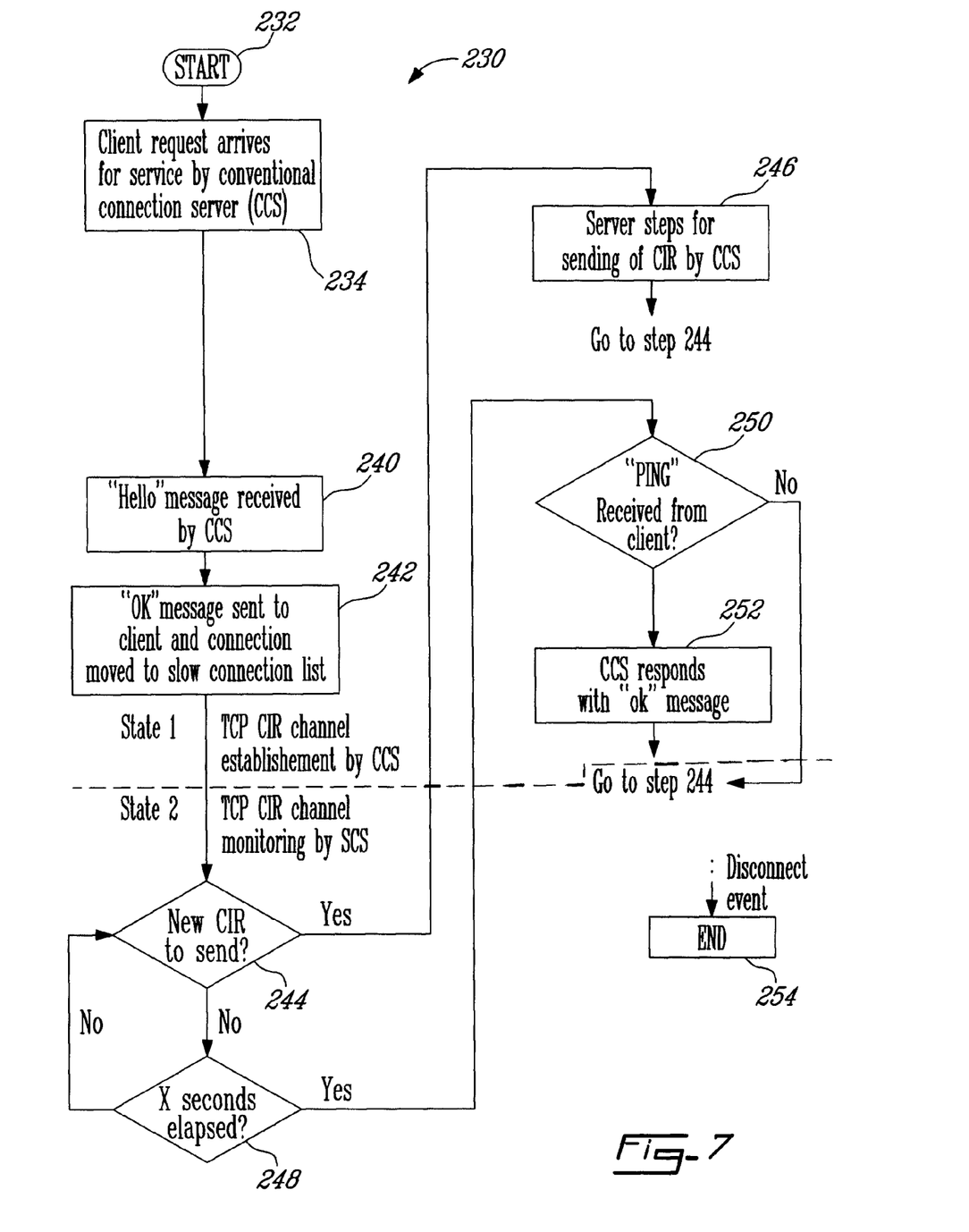
FIG. 7 is a flow chart of a TCP CIR channel monitoring process in accordance with an illustrative embodiment of the present invention.

FIG. 7 depicts the two-state process in accordance with some examples, and the illustrated method will be generally referred to herein using the reference numeral 230, which begins at start step 232 upon a request for a TCP CIR channel by the client 18 being received by the server 14. Next at step 234, the request is received by a Conventional Connection Server (CCS) for initial service. It will be understood that the CCS acts as a conventional socket server and waits for new connections by listening to a well-known TCP port.

The server 14 responds to the client 18, providing the port that has been assigned to the client 18. The client 18 receives the message from the server 14, and replies with the "HELO" message. When the CCS receives the "HELO" message at step 240, it (i) replies to the client with the "OK" message; and (ii) moves the connection from the NewConnectionList to the SlowConnectionList (step 242). At this point, the TCP CIR channel is established and the process transits from state 1 (TCP CIR channel establishment by the CCS) to state 2 (TCP CIR channel monitoring by the Slow Connection Server).

In state two, the Slow Connection Server (SCS) handles the TCP CIR channel. The SCS carries out at least one main activity: (1) for incoming messages, detecting the arrival of "PING" messages, and subsequently replying with "OK" messages.

With reference again to FIG. 7, a determination is made at step 244 as to whether the CCS needs to transmit a CIR to the client 18. If yes, temporary state transitioning occurs so that the CCS can transmit the CIR to the client 18 at step 246, and then the SCS returns to standby (i.e. the step 244) after SCS to CCS, and back to SCS state transitions. If no, the SCS stays in standby for a configurable wait time X for periodic inspection of the socket for the port assigned to the channel has not yet elapsed (step 248). (Wait time X can be any suitable wait time such as, for example, 5 to 10 seconds.) If wait time X has elapsed, decision step 250 is next in which the SCS first inspects the socket for the port assigned to the channel. If it is discovered that a "PING" message has been received, temporary state transitioning occurs so that the CCS can reply to the client 18 with an "OK" message. After the step 252, the SCS returns to standby (i.e. the step 244) after SCS to CCS, and back to SCS state transitions. Alternatively, if the "PING" message has not been received, the SCS simply returns to standby (i.e. the step 244).

It will be understood that a disconnect event may occur while the TCP CIR channel is being monitored by the SCS. Possible disconnect events include, for example, detection that the client 18 has closed the connection or receipt of a request from the server 14 for the SCS to close the TCP CIR channel. (As an additional note, one skilled in the art will appreciate that, in at least one example, the server 14 can notify the client 18 that a CIR channel is disconnected by setting a CIR flag "F" in an http POST response.) The occurrence of the disconnect event leads to end step 254 in the method 230.

In addition to the two-state process described above, the approach may be extended to situations in which TCP connections are established and maintained between a mobile device and a server for a very long duration, and during which the connections are used only sporadically while they are established. The TCP CIR channel is one specific occurrence of this usage pattern. However, the usage pattern matches other types of employments of TCP connections, the usage pattern being characterized by: (1) An initial period during which there is activity to set up the TCP connection, and to make an initial use of it, the initial use justifying the establishment of the connection and wherein the initial period of activity is of a short duration compared to the overall duration of the connection; (2) a subsequent period of long duration during which the TCP connection is dormant (meaning that no messages are exchanged), except for short periods during which there is activity (meaning exchange of messages); (3) a final period of short duration during which the TCP connection is closed; and (4) clients that can tolerate a delay of several seconds between initiating a message and receiving its response.

Figure 8:
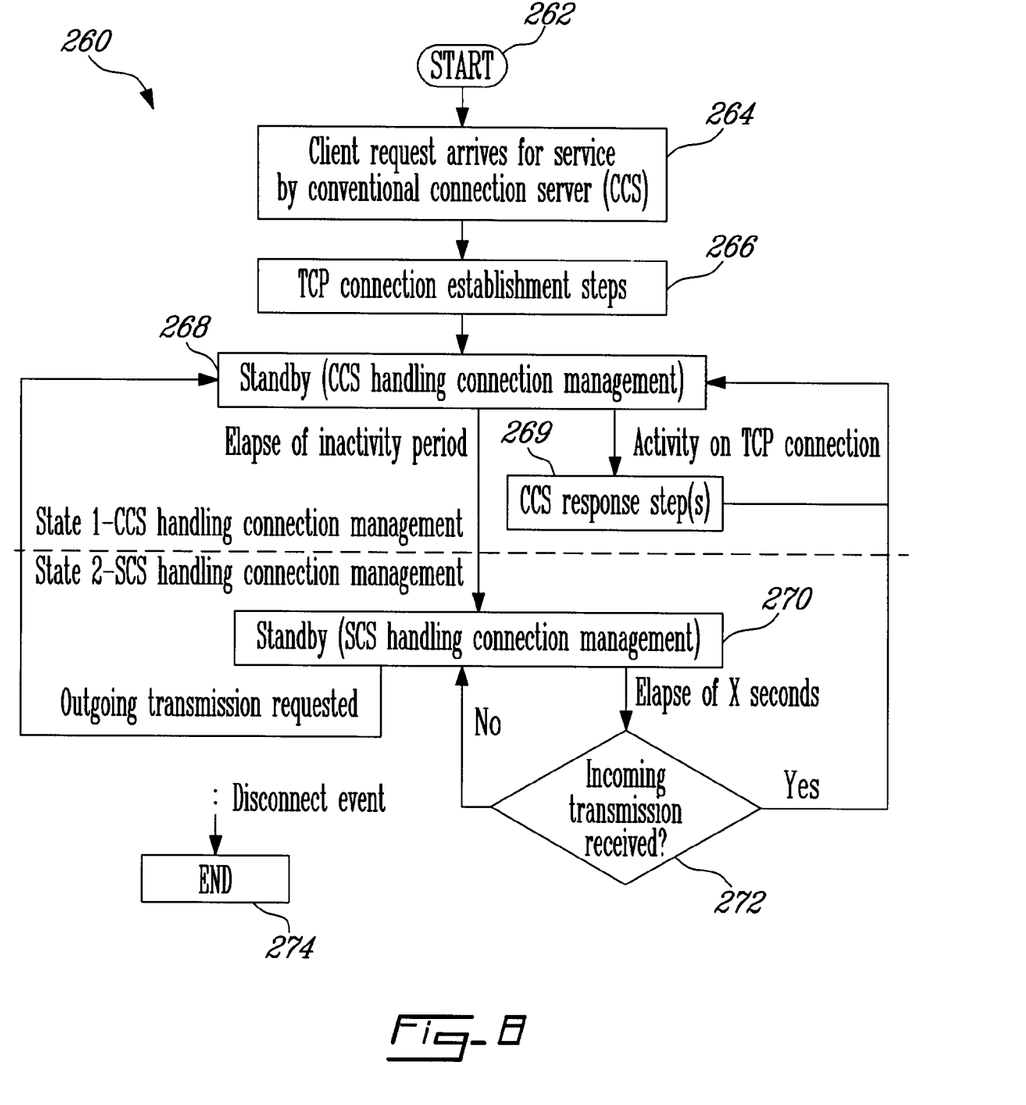
FIG. 8 is a flow chart of a TCP CIR channel monitoring process in accordance with an alternative illustrative embodiment of the present invention.

FIG. 8 illustrates a TCP connection method 260 in accordance with an example embodiment. The method 260 implements a two-state process similar to the previously described process in relation to the TCP CIR channel example. However, as opposed to the preceding section where the process progresses from state 1 to state 2, the process here oscillates between states 1 and 2 as a function of the activity of the TCP connection.

The method 260 begins at start step 262 upon a client request for a TCP connection being received by the server. Next at step 264, the request is received by a CCS for initial service. Following the step 264, a TCP connection is established between the client and the server (steps 266) and once established, the connection is put in the ActiveConnectionList (it will be understood that the connection remains in the ActiveConnectionList, and thus in state 1, for as long as it is being actively used). Next at step 268, the CCS is kept in standby mode, in that it awaits either of (i) activity on the TCP connection which brings about CCS response step(s) 269; or (ii) the elapse of an inactivity period as described below.

If the initial activity period happens to elapse, the connection becomes inactive (dormant). This event is, for example, detected by the CCS through the inactivity period exceeding a configurable inactivity threshold. Upon occurrence of this event, management of the connection is moved to the SCS, thereby proceeding from state 1 to state 2. In FIG. 8, the transition from state 1 to state 2 is illustrated by a transition arrow between the step 268 and step 270. Upon occurrence of the transition from state 1 to state 2, the connection is then reassigned from the ActiveConnectionList to the SlowConnectionList. (In at least one example embodiment, carrying this out involves removing a port number associated with the connection from the ActiveConnectionList, and then adding that port number to the SlowConnectionList)

Similarly as described before, the SCS, in at least some examples, carries out the following activities: (1) monitoring server-side initiated activity on the connection, triggering an outgoing data transmission (for example, message) to be sent from the server to the client; and (2) monitoring client-side initiated activity on the connection, triggering an incoming data transmission (for example, message) to be fetched. With respect to monitoring of client-side initiated activity, the SCS periodically inspects the socket for the port assigned to the connection (step 272) to detect any new incoming data transmissions (for example, new message(s) from the client). This period (referred to as "X seconds" in FIG. 8) is configurable and can be of several seconds (for example, X=5 to 10 seconds).

When the SCS detects activity, either incoming (at the step 272) or outgoing, it declares that the connection has become active again. The connection is then reassigned from the SlowConnectionList to the ActiveConnectionList. (It will be understood that in some examples this reassignment is carried out by the SCS.) The process then moves back to state 1, and the TCP activity is handled by the CCS. Both the transition arrow between the step 272 and the step 268, and the transition arrow between the step 270 and the step 268 illustrate alternatives moves of the process from state 2 back to state 1.

When the period of activity expires again, the client once again becomes inactive. This process will typically repeat itself on an ongoing basis as the client becomes active and inactive. If a particular connection is assigned to the ActiveConnectionList, that connection's data traffic will be handled with a faster response time because the associated port for the connection will be scanned at a higher frequency. Likewise, if a particular connection is assigned to the SlowConnectionList, that connection's data traffic will be handled with a slower response time because the associated port for the connection will be scanned at a lower frequency.

In some examples, the state transition causing inactivity event is detected by an inactivity timer. In such examples, the inactivity timer reassigns the connection back to the SCS. In other examples, the inactivity event will be detected by some other means (for example, by counting occurrences of some other timed reoccurring event) and the connection may be reassigned back to the SCS by some alternative entity besides the inactivity timer such as, for example, the CCS.

In the method 260, both the CCS and the SCS may close the TCP CIR connection upon occurrence of a disconnect event such as, for example, when the need arises to free the resources as requested by the server or upon detecting that the client has closed the connection. As shown in FIG. 8, a disconnect event brings about transition to the end step 274.

It will be understood that in at least some examples both the CCS and the SCS are capable of handling a plurality of TCP connections such as may occur when, for instance, one server 14 services many clients 18 within the mobile communications system 10.

GLOSSARY OF ACRONYMS USED

CSP—Client-Server Protocol
CDMA—Code Division Multiple Access
CIR—Communication Initiation Request
CCS—Conventional Connection Server
GSM—Global System for Mobile Communications
HTTP—Hypertext Transfer Protocol
IMPS—Instant Message and Presence Service
IP—Internet Protocol
MO—Mobile-Originated
MSISDN—Mobile Station International Subscriber Directory Number
MT—Mobile-Terminated
OMA—Open Mobile Alliance
PAP—Push Access Protocol
PPG—Push Proxy Gateway
RF—Radio Frequency
SAP—Service Access Point
SMS—Short Message Service
SCS—Slow Connection Server
TCP—Transmission Control Protocol TCP/IP—Transmission Control Protocol/Internet Protocol
UDP—User Datagram Protocol
UDP/IP—User Datagram Protocol/Internet Protocol
WAP—Wireless Application Protocol
WV—Wireless Village Certain adaptations and modifications of the described embodiments can be made. Therefore, the above-discussed embodiments are considered to be illustrative and not restrictive.

What is claimed is:

1. A method for transmitting Communication Initiation Request (CIR) messages from a server to a mobile client during a session, the client supporting a plurality of CIR channel bindings, the method comprising:
   selecting, by a server, a first one of a plurality of CIR channel bindings supported by a mobile client;
   transmitting, by the server, at least one CIR message via said first CIR channel binding to the mobile client over a unidirectional channel from the server to the mobile client;
   determining whether the server receives a polling request from the mobile client over a bi-directional data channel between the server and the mobile client, in response to the at least one CIR message; and
   if the server does not receive the polling request from the mobile client, then:
      selecting, by the server, a second one of the plurality of CIR channel bindings supported by the mobile client; and
      subsequently transmitting, by the server, at least one subsequent CIR message via said second CIR channel binding to the mobile client over the unidirectional channel from the server to the mobile client,
   wherein said at least one CIR message and said at least one subsequent CIR message are transmitted during the same session.

2. The method as claimed in claim 1, further comprising a client-server negotiation during which notice is received from the client of the plurality of CIR channel bindings supported by the client.

3. The method as claimed in claim 2, wherein said client-server negotiation during which notice is received from the client of the plurality of CIR channel bindings supported by the client further includes receiving notice from the client of an order in which said plurality of CIR channel bindings are to be selected.

4. The method as claimed in claim 1, wherein the plurality of CIR channel bindings are selected from the group consisting of a TCP CIR channel binding, UDP CIR channel binding, HTTP CIR channel binding, SMS CIR channel binding, WAP push over SMS as bearer CIR channel binding, and WAP push over UDP/IP as CIR bearer channel binding.

5. The method as claimed in claim 1, wherein the plurality of CIR channel bindings includes a TCP CIR channel binding and wherein the TCP CIR channel binding is a preferred selected CIR channel binding.

6. The method as claimed in claim 1, wherein said first selected CIR channel binding is first in an order list, and said second selected CIR channel binding is second in said order list.

7. The method as claimed in claim 6, wherein said order list specifies most preferred to least preferred CIR channel bindings vis-à-vis the client.

8. The method as claimed in claim 7, wherein the client runs on a mobile end system having at least one computer readable medium, said order list stored on a computer readable medium of said mobile end system.

9. The method as claimed in claim 6, wherein said order list specifies most preferred to least preferred CIR channel bindings vis-à-vis said server.

10. The method as claimed in claim 9, wherein said order list is stored on a computer readable medium remote from a mobile end system upon which the client runs.

11. The method as claimed in claim 6, wherein a weighting algorithm is applied to generate said order list, said weighting algorithm taking into account both a client order list that specifies most preferred to least preferred CIR channel bindings vis-à-vis the client, and a server order list that specifies most preferred to least preferred CIR channel bindings vis-à-vis said server.

12. The method as claimed in claim 1, further comprising receiving notice from the client of the plurality of CIR channel bindings supported by the client, said receiving notice from the client of the plurality of CIR channel bindings supported by the client carried out during a login procedure between said server and the client.

13. The method as claimed in claim 1, wherein said first selected CIR channel binding is a TCP CIR channel binding and said second selected CIR channel binding is an SMS CIR channel binding.

14. A non-transitory computer readable medium comprising memory configured to cause a computer, using computer code, to:
   select a first one of a plurality of Communication Initiation Request (CIR) channel bindings supported by a mobile client;
   transmit at least one CIR message via said first CIR channel binding to the mobile client over a unidirectional channel from the computer to the mobile client;
   determine whether the computer receives a polling request from the mobile client over a bi-directional data channel between the computer and the mobile client, in response to the at least one CIR message; and
   if the computer does not receive the polling request from the mobile client, then:
      select a second one of the plurality of CIR channel bindings supported by the mobile client; and
      subsequently transmit at least one subsequent CIR message via said second CIR channel binding to the mobile client over the unidirectional channel from the computer to the mobile client,
   wherein said at least one CIR message and said at least one subsequent CIR message are transmitted during the same session.

15. In a mobile communications system, a server in a ground end system, the server in a communication session with at least one mobile client that supports a plurality of Communication Initiation Request (CIR) channel bindings, memory configured to cause the server, using computer code, to:
   generate CIR messages;
   select a first one of a plurality of CIR channel bindings supported by a mobile client;
   transmit at least one CIR message via said first selected CIR channel binding to the mobile client over a unidirectional channel from the server to the mobile client;
   determine whether the server receives a polling request from the mobile client over a bi-directional data channel between the server and the mobile client, in response to the at least one CIR message;
   if the server does not receive the polling request from the mobile client, then:

select a second one of the plurality of CIR channel bindings supported by the mobile client; and transmit at least one subsequent CIR message via said second selected CIR channel binding to the mobile client over the unidirectional channel from the server to the mobile client, wherein said at least one CIR message and said at least one subsequent CIR message are transmitted during the same session.

16. The ground end system as claimed in claim 15, said memory further configured to cause the server to carry out client-server negotiation during which notice is received from the client of the plurality of CIR channel bindings supported by the client.

17. The ground end system as claimed in claim 16, wherein carrying out client-server negotiation includes memory configured to cause the server to provide the client with a CIR poll URL.

18. The ground end system as claimed in claim 15, wherein said server is adapted to receive notice from the client of an order in which said plurality of CIR channel bindings are to be selected.

19. The ground end system as claimed in claim 15, wherein the plurality of CIR channel bindings are selected from the group consisting of a TCP CIR channel binding, UDP CIR channel binding, HTTP CIR channel binding, SMS CIR channel binding, WAP push over SMS as bearer CIR channel binding, and WAP push over UDP/IP as CIR bearer channel binding.

20. The ground end system as claimed in claim 15, wherein the plurality of CIR channel bindings includes a TCP CIR channel binding and wherein said server identifies the TCP CIR channel binding as a preferred CIR channel binding for selection.

21. The ground end system as claimed in claim 15, wherein said first selected CIR channel binding is first in an order list stored on a computer readable medium of the ground end system, and said second selected CIR channel binding is second in said order list.

22. The ground end system as claimed in claim 21, said memory further configured to cause the server to dynamically change said order list upon detection that a prerequisite for use of one of said plurality of CIR channel bindings is lacking.

23. The ground end system as claimed in claim 21, wherein said order list specifies most preferred to least preferred CIR channel bindings vis-à-vis the server.

24. The ground end system as claimed in claim 21, said memory further configured to cause the server to apply a weighting algorithm to generate another order list, said weighting algorithm taking into account a client order list, adapted to be received at said server, that specifies most preferred to least preferred CIR channel bindings vis-à-vis the client, and also taking into account said order list stored on said sever that specifies most preferred to least preferred CIR channel bindings vis-à-vis said server.

25. The ground end system as claimed in claim 15, wherein said first selected CIR channel binding is a TCP CIR channel binding and said second selected CIR channel binding is an SMS CIR channel binding.

26. The ground end system as claimed in claim 15, said memory further configured to cause the server to detect a condition to trigger generation of said CIR message.

27. The ground end system as claimed in claim 26, said memory further configured to cause the server to establish a data channel for the exchange of Client-Server Protocol primitives between the client and the server, said condition comprising a selected one of the following: said data channel having not been established, halting of event communication in said data channel.

28. A non-transitory computer readable medium comprising memory configured to cause a computer, using computer code, to:

select a first one of a plurality of CIR channel bindings supported by a mobile client;

transmit at least one CIR message via said first CIR channel binding to the mobile client over a unidirectional channel from the computer to the mobile client;

determine whether the computer receives a polling request from the mobile client over a bi-directional data channel between the computer and the mobile client, in response to the at least one CIR message; and if the computer does not receive the polling request from the mobile client, then:

select a second one of the plurality of CIR channel bindings supported by the mobile client; and subsequently transmit at least one subsequent CIR message via said second CIR channel binding to the mobile client over the unidirectional channel from the computer to the mobile client;

wherein said at least one CIR message and said at least one subsequent CIR message are transmitted during the same session.

* * * * *